(12) United States Patent
Grieco

(10) Patent No.: US 9,944,062 B2
(45) Date of Patent: Apr. 17, 2018

(54) COMPOSITE AIRCRAFT MANUFACTURING TOOLING AND METHODS USING ARTICULATING MANDRELS

(71) Applicant: Gulfstream Aerospace Corporation, Savannah, GA (US)

(72) Inventor: James R. Grieco, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 14/967,802

(22) Filed: Dec. 14, 2015

(65) Prior Publication Data

US 2017/0165907 A1 Jun. 15, 2017

(51) Int. Cl.
| | | |
|---|---|---|
| *B32B 37/00* | (2006.01) | |
| *B32B 37/18* | (2006.01) | |
| *B29C 65/70* | (2006.01) | |
| *B29C 35/02* | (2006.01) | |
| *B29C 65/02* | (2006.01) | |
| *B29C 65/00* | (2006.01) | |
| *B32B 37/06* | (2006.01) | |
| *B32B 37/10* | (2006.01) | |
| *B29C 70/30* | (2006.01) | |
| *B29L 31/30* | (2006.01) | |

(52) U.S. Cl.
CPC .......... *B32B 37/18* (2013.01); *B29C 35/0227* (2013.01); *B29C 65/02* (2013.01); *B29C 65/70* (2013.01); *B29C 66/8145* (2013.01); *B29C 70/30* (2013.01); *B32B 37/06* (2013.01); *B32B 37/10* (2013.01); *B29L 2031/3076* (2013.01); *B32B 2605/18* (2013.01); *Y02T 50/433* (2013.01)

(58) Field of Classification Search
CPC .............. B29C 65/70; B29C 66/81451; B29C 66/81463; B29C 70/46; B21D 9/03; B32B 37/18
USPC .................................................. 425/403, 518
See application file for complete search history.

(56) References Cited

U.S. PATENT DOCUMENTS

| | | | |
|---|---|---|---|
| 3,286,503 A * | 11/1966 | Garrett ..................... | B21D 9/03 72/466 |
| 5,323,631 A * | 6/1994 | Weykamp .............. | B21D 25/02 72/296 |

(Continued)

*Primary Examiner* — John Goff
(74) *Attorney, Agent, or Firm* — LKGlobal | Lorenz & Kopf, LLP

(57) ABSTRACT

Composite tooling systems and methods of manufacturing composite stringers of aircraft are provided herein. A composite tooling system includes a layup tool and an articulating stringer mandrel. The layup tool has a contoured surface with portions having different surface complexities. The articulating stringer mandrel includes two rigid mandrel elements and a cable. The first rigid mandrel element defines a first aperture, a first stringer surface, and a first bottom surface. The second rigid mandrel element is adjacent to the first rigid mandrel element and defines a second aperture, a second stringer surface, and a second bottom surface. A first length of the first rigid mandrel element cooperates with the surface complexity and a second length of the second rigid mandrel element cooperates with the surface complexity at the second rigid mandrel element so that a gap between the rigid mandrel elements does not exceed a predetermined gap threshold.

6 Claims, 4 Drawing Sheets

(56) References Cited

U.S. PATENT DOCUMENTS

| | | | | |
|---|---|---|---|---|
| 5,632,940 A | * | 5/1997 | Whatley | B29C 70/342 156/173 |
| 6,244,092 B1 | * | 6/2001 | Grobbenhaar | B21D 9/03 72/466 |
| 2009/0000726 A1 | * | 1/2009 | McCowin | B29C 33/308 156/212 |
| 2013/0291615 A1 | * | 11/2013 | Jung | B21D 5/10 72/356 |

* cited by examiner

COMPOSITE AIRCRAFT MANUFACTURING TOOLING AND METHODS USING ARTICULATING MANDRELS

TECHNICAL FIELD

The present invention relates generally to tooling and methods for making composite reinforced structures for aircraft, and more particularly relates to aircraft wing tooling and methods with articulating stringer mandrels having rigid mandrel elements.

BACKGROUND

The fuselage, wings, and empennage of an aircraft typically include stringers that are coupled to skin that forms the smooth aerodynamic outer surfaces of the fuselage, wings, and empennage. The stringers and skin cooperate to provide flexural and torsional stiffness to these sections of the aircraft. Traditionally, the fuselage, wings, and empennage surfaces and the associated stringers are fabricated from metal, such as aluminum, steel, or titanium.

Fiber reinforced composite materials are widely used in a variety of commercial and military aircraft products as a substitute for metals, particularly in applications where relatively low weight and high mechanical strength are desired. The material is generally comprised of a network of reinforcing fibers that are arranged in layers or plies. The layers include a resin matrix that substantially wets the reinforcing fibers and that is cured to form an intimate bond between the resin and the reinforcing fibers. The composite material may be formed into a structural component by a variety of known forming methods, such as extrusion, vacuum bagging, autoclaving, and/or the like.

As the skins and stringers for various sections of aircraft transition from metallic materials to fiber reinforced composite materials, multiple issues have arisen. In a current fabrication process known as Pre-cure/Co-bond or Co-bond, a fiber reinforced composite skin is formed by stacking layers together that contain reinforcing fibers in a resin matrix. Typically, some of the layers are staggered relative to each other so that the stack conforms to a desired contoured or tapered geometry. The stacked layers are heated and pressurized to cure the polymeric resin matrix and form a precured skin. A stringer mandrel is placed on the stacked layers and stringer plies are stacked onto the stringer mandrel. Pressure and heat are applied to cure the stringer preform using the tooling to form a fiber reinforced composite stringer that is attached to the precured skin. Unfortunately, defects often occur along the interface between the precured skin and the fiber reinforced composite stringer. In particular, the skin typically has a contoured outer surface that includes small steps or drop-offs that are formed by the gaps between mandrel elements of the stringer mandrel. Large gaps cause under compressed areas, e.g., voids, and over compressed areas, e.g., resin poor areas, within the composite stringer. These under and over compressed areas can reduce the load transfer efficacy between the precured skin and the fiber reinforced composite stringer, thereby reducing the rigidity and support provided by the fiber reinforced composite stringer.

The stringer is then Co-cured over the pre-cured skin in a second curing cycle. Pre-curing provides good skin quality due to uniform bagging pressure and relatively simple geometry, but requires two runs of the autoclave process and preparation. Requiring two runs becomes very expensive and time consuming, and introduces risk associated with re-heating the skin laminate.

Another current fabrication method is Co-cure, which allows creating a complex part in a single autoclave curing step. The disadvantage of Co-cure is that bagging over complex shapes creates a non-uniform pressure where the laminate quality can suffer by having resin rich/starved areas, and potential ply distortion due to uneven pressure.

A third current fabrication method is Secondary Bonding, in which all of the constituent components are pre-cured, and then assembled in a bond mold with adhesive and cured together. Secondary Bonding provides the best laminate quality for all parts, but requires multiple cure cycles, increased of preparation, extra tooling, and increased difficulty with fit-up issues of pre-cured parts.

Conventional mandrels include foam mandrels and elastomeric mandrels. Foam mandrels are difficult to remove from the fiber reinforced composite stringer after curing and are often considered "flyaway" tooling that remains in the composite wing. Elastomeric mandrels are easier to remove from the cured composite stringer, but do not offer the stiffness and rigidity required for well-defined edges in the composite stringer. Furthermore, the elastomeric mandrels are typically only available for several uses before the elastomeric material begins breaking down and is not able to withstand the curing process.

Accordingly, it is desirable to provide composite tooling systems and methods of manufacturing composite stringers that are removable from the stringer after curing, are durable, and provide the rigidity to produce well-defined edges on the cured composite stringer. Furthermore, other desirable features and characteristics of the present invention will become apparent from the subsequent detailed description and the appended claims, taken in conjunction with the accompanying drawings and this background.

BRIEF SUMMARY

Composite tooling systems and methods of manufacturing composite stringers of aircraft are provided herein. In accordance with an exemplary embodiment, a composite tooling system includes a layup tool and an articulating stringer mandrel. The layup tool has a contoured surface with a first portion with a first surface complexity and a second portion with a second surface complexity. The articulating stringer mandrel includes a first rigid mandrel element, a second rigid mandrel element, and a cable. The first rigid mandrel element defines a first aperture, a first stringer surface to which the composite stringer conforms, and a first bottom surface opposing the first portion of the contoured surface. The first rigid mandrel element has a first length along a longitudinal direction of the composite stringer. The second rigid mandrel element is adjacent to the first rigid mandrel element and defines a second aperture, a second stringer surface to which the composite stringer conforms, and a second bottom surface opposing the second portion of the contoured surface. The second rigid mandrel element has a second length along the longitudinal direction. The cable extends through the first aperture and the second aperture. The first length cooperates with the first surface complexity and the second length cooperates with the second surface complexity so that a gap between the first rigid mandrel element and the second rigid mandrel element does not exceed a predetermined gap threshold.

In accordance with another exemplary embodiment, a method of manufacturing a composite stringer of an aircraft includes laying skin plies on a layup tool that includes a contoured surface having a first portion with a first surface complexity and a second portion with a second surface complexity. The method further includes placing an articulating stringer mandrel on the skin plies. Placing the articulating stringer mandrel further includes positioning a first rigid mandrel element on the skin plies so that a first bottom surface of the first rigid mandrel opposes the first portion, where the first rigid mandrel defines a first aperture and a first stringer surface to which the composite stringer conforms. The first rigid mandrel element has a first length along a longitudinal direction of the composite stringer. Placing the articulating stringer mandrel further includes positioning a second rigid mandrel element on the skin plies adjacent to the first rigid mandrel element so that a second bottom surface of the second rigid mandrel element opposes the second portion, the second rigid mandrel defining a second aperture and a second stringer surface to which the composite stringer conforms. The second rigid mandrel element has a second length along the longitudinal direction. Positioning the first rigid mandrel is based at least in part on the first length and the first surface complexity and positioning the second rigid mandrel is based at least in part on the second length and the second surface complexity so that a gap between the first rigid mandrel element and the second rigid mandrel element does not exceed a predetermined gap threshold. The method further includes tightening a cable that extends through the first aperture and the second aperture. The method further includes laying stringer plies overtop the articulating stringer mandrel and curing the skin plies and the stringer plies.

BRIEF DESCRIPTION OF THE DRAWINGS

The present invention will hereinafter be described in conjunction with the following drawing figures, wherein like numerals denote like elements, and wherein.

DETAILED DESCRIPTION

The following Detailed Description is merely exemplary in nature and is not intended to limit the invention or the application and uses of the invention. Furthermore, there is no intention to be bound by any theory presented in the preceding background or the following detailed description.

Various embodiments contemplated herein relate to tooling for manufacturing fiber reinforced composite stringers, and to methods for making such reinforced composite stringers. In the example provided, the fabrication process is a Co-cure process. Unlike the prior art, the exemplary embodiments taught herein arrange rigid mandrel elements of an articulating mandrel based on a surface complexity of the wing at each portion of the stringer, which addresses the conventional process shortcomings of mandrel distortion and uneven pressure, which causes ply distortion. Each rigid mandrel element has dimensions that are suitable for disposition over a portion of the wing tooling with a surface complexity that interacts with the dimensions of the rigid mandrel element. The interaction causes misalignment of adjacent mandrel elements, resulting in a gap between edges of the adjacent rigid mandrel elements. The dimensions of the rigid mandrel elements are smaller at portions of the tooling that have higher surface complexity so that the gap does not exceed a gap threshold. By keeping the gap below the gap threshold, stepping and other undesirable composite deficiencies may be reduced.

Figure 1A:
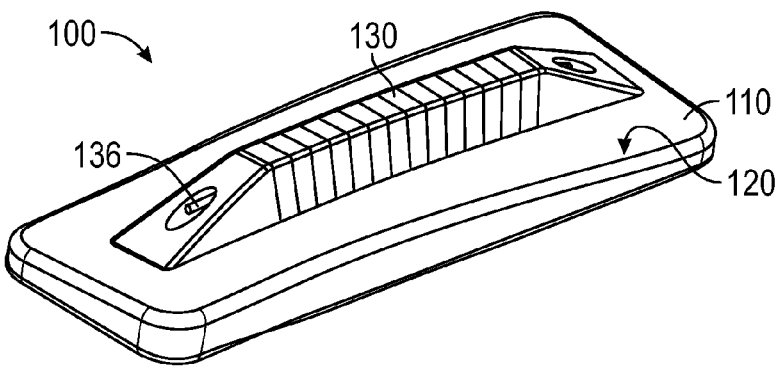
FIGS. 1A, 1B, 1C, and 1D are views of a composite tooling system in accordance with an exemplary embodiment.
Figure 1B:
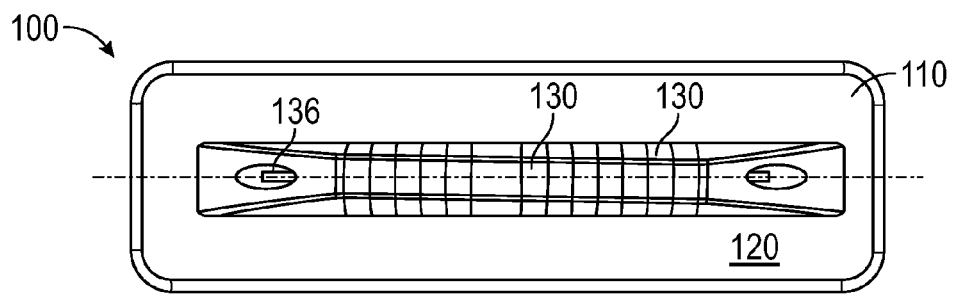
Figure 1C:
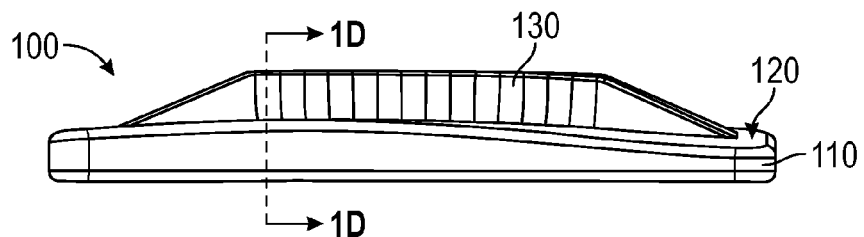
Figure 1D:
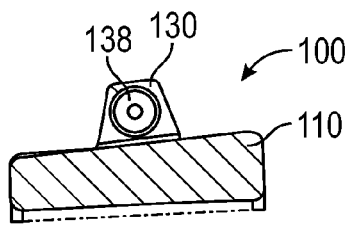
Figure 2:
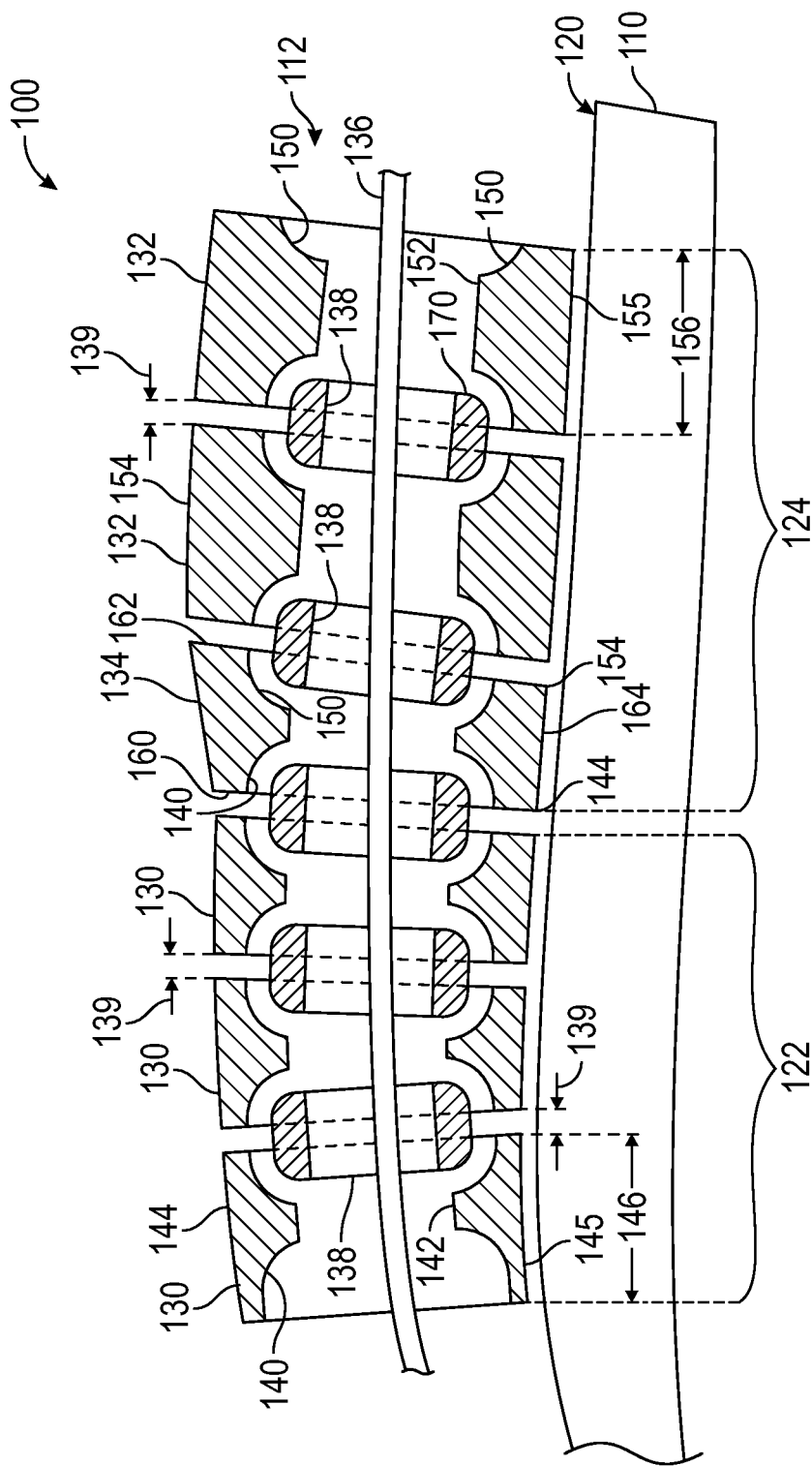
FIG. 2 is a sectional view of the composite tooling system depicted in FIG. 1 with exaggerated dimensions for ease of explanation.
Figure 3:
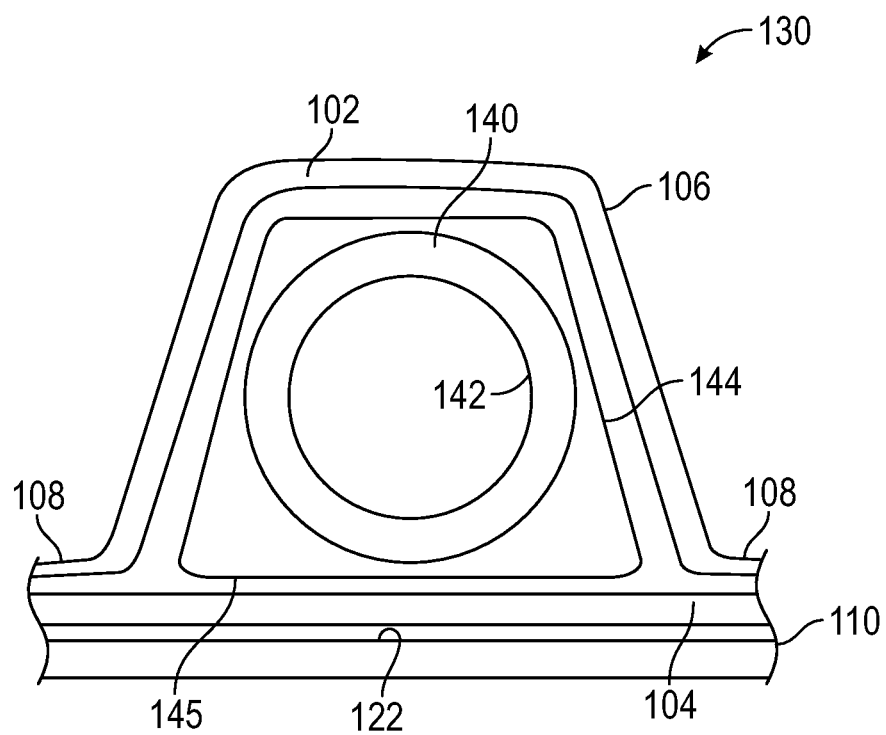
FIG. 3 is a front view of a rigid mandrel element of the composite tooling system depicted in FIG. 2.
Figure 4:
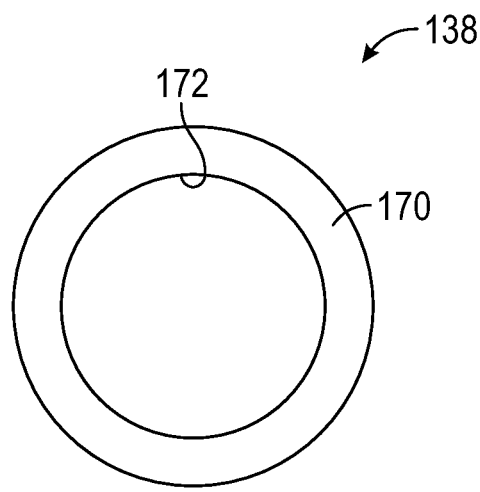
FIG. 4 is a front view of a mandrel ball of the composite tooling system depicted in FIG. 2.

Referring to FIGS. 1A-D and 2-4, views of a composite tooling system 100 and components of composite tooling system 100 are provided in accordance with an exemplary embodiment. FIGS. 2-4 have exaggerated dimensions when compared with FIGS. 1A-D for ease of explanation of the features of composite tooling system 100. Composite tooling system 100 may be used to manufacture a composite stringer 102 and composite skin 104 of an aircraft, as can be seen in FIG. 3. Composite stringer 102 and composite skin 104 are each formed of fiber reinforced composite material. As illustrated, in accordance with an exemplary embodiment, composite stringer 102 comprises a beam body portion 106 and two runout portions 108 that extend from beam body portion 106 in opposite directions. Composite stringer 102 generally follows the contours of composite skin 104.

Composite tooling system 100 includes a layup tool 110 and an articulating stringer mandrel 112. Layup tool 110 defines a contoured surface 120 that has a first portion 122 and a second portion 124. First portion 122 has a first surface complexity and second portion 124 has a second surface complexity that is less than the first surface complexity. As will be appreciated by those with ordinary skill in the art, the surface complexity refers to the rate of change of the slope of contoured surface 120. Surface complexity also includes ramps due to ply drops under the mandrel. Accordingly, a portion with a high surface complexity has a slope that changes more quickly than does a portion with a low surface complexity. For example, a flat surface has no surface complexity.

Articulating stringer mandrel 112 includes a first rigid mandrel element 130, a second rigid mandrel element 132, a third rigid mandrel element 134, a cable 136, and a plurality of mandrel balls 138. FIGS. 1A-C illustrate additional end elements 137 that are provide a bearing surface for tightening articulating stringer mandrel 112 with cable 136. The example provided includes a plurality of first rigid mandrel elements 130 and a plurality of second rigid mandrel elements 132. The number of rigid mandrel elements 130, 132, 134 may vary based on the particular stringer and the shape of the skin to be manufactured, as will be appreciated by those with ordinary skill in the art.

The arrangement of rigid mandrel elements 130, 132, 134 is based on the surface complexity of contoured surface 120 and on the dimensions (e.g., length and/or width) of each rigid mandrel element 130, 132, 134 to ensure that a gap 139 between each rigid mandrel element 130, 132, 134 does not exceed a predetermined gap threshold. The predetermined gap threshold is based on composite process characteristics that impact stepping in the composite stringer. For example, the gap threshold may be based on reducing stepping based on resin properties, autoclave pressures, or other composite process characteristics. While the mandrel elements shown can be substantially the same, it is possible to reduce stepping further by sanding or otherwise dressing the joints between rigid mandrel elements after the mandrel assembly is at its proper shape and the cable is tightened.

Rigid mandrel elements 130, 132, 134 and mandrel balls 138 are formed from a rigid material. As used herein, the term "rigid material" refers to a material that substantially maintains shape during an autoclave process to cure the composite material. In the example provided, the rigid material is a metal material, such as aluminum or invar. In some embodiments, the rigid material has a Young's modulus that is greater than about 10 GPa. In some embodiments, the rigidity of materials could be metal with Young's moduli from 10×10^6 to 30×10^6 psi. In contrast, flexible materials—such as elastomeric materials—that readily deform under autoclave temperatures and pressures are explicitly excluded from the preceding definition of "rigid material." As will be appreciated by those with ordinary skill in the art, the specific rigid material may vary based on the temperatures and forces involved in any particular autoclave process. In some embodiments, rigid polymers with higher durometers than flexible rubber may be used, such that if a mandrel were made one piece, it would not be flexible enough to allow extraction from the cavity. In general, the material is rigid enough to maintain shape, and tough enough for re-use without damage during extraction.

The rigid material may also be at least partially selected based on the expansion characteristics required. Invar or carbon composite mandrels have low expansion relative to the composite part, but are then more difficult to remove. In some embodiments, rigid mandrel elements 130, 132, 134 and mandrel balls 138 have an elastomeric coating.

First rigid mandrel element 130 defines a first cavity 140, an aperture 142, a first cross section perimeter 144, and a first bottom surface 145. Each longitudinal end of first rigid mandrel element 130 includes a first cavity 140 to receive a mandrel ball 138. In the example provided, first cavity 140 is defined by a spherical surface that opposes each mandrel ball 138. The spherical surface accommodates rotation and longitudinal misalignment of adjacent rigid mandrel elements 130, 132, 134 so that articulating stringer mandrel 112 may conform to contoured surface 120.

Aperture 142 extends through a longitudinal length of first rigid mandrel element 130 between first cavities 140 on each side of first rigid mandrel element 130. Aperture 142 accommodates cable 136 to facilitate assembly of articulating stringer mandrel 112.

First cross section perimeter 144 defines a shape of composite stringer 102, which conforms to first cross section perimeter 144 during autoclave curing. The shape of first cross section perimeter may vary based on the particular implementation and desired stringer shape. In the example provided, first cross section perimeter 144 is substantially trapezoidal in shape.

First bottom surface 145 opposes first portion 122 of contoured surface 120. First rigid mandrel element 130 has a first length 146 along the longitudinal direction of articulating stringer mandrel 112 and composite stringer 102. First length 146 is defined at least in part by the first surface complexity. For example, selection of the order of rigid mandrel elements 130, 132, 134 along the length of articulating stringer mandrel 112 is coordinated with the surface complexity of contoured surface 120 at each portion of articulating stringer mandrel 112 and composite stringer 102. Portions of contoured surface 120 with a high surface complexity (e.g., first portion 122) require a shorter length (e.g., first length 146) to ensure that gap 139 does not exceed the gap threshold.

Second rigid mandrel element 132 defines a second cavity 150, an aperture 152, a second cross section perimeter 154, and a second bottom surface 155. Each longitudinal end of second rigid mandrel element 132 includes a second cavity 150 to receive a mandrel ball 138. In the example provided, second cavity 150 is defined by a spherical surface that opposes each mandrel ball 138. The spherical surface accommodates rotation and longitudinal misalignment of adjacent rigid mandrel elements 130, 132, 134 so that articulating stringer mandrel 112 may conform to contoured surface 120. In the example provided, second cavity 150 has a shape that is substantially identical to a shape of first cavity 140.

Aperture 152 extends through a longitudinal length of second rigid mandrel element 132 between second cavities 150 on each side of second rigid mandrel element 132. Aperture 152 accommodates cable 136 to facilitate assembly of articulating stringer mandrel 112.

Second cross section perimeter 154 defines a shape of composite stringer 102, which conforms to second cross section perimeter 154 during autoclave curing. The shape of second cross section perimeter 154 may vary in different embodiments based on the particular implementation and desired stringer shape. In some embodiments, the shape of second cross section perimeter 154 may vary along the length of second rigid mandrel element 132. In the example provided, second cross section perimeter 154 is substantially identical in shape to first cross section perimeter, is larger than first cross section perimeter 144, and has a uniform shape through a length of second rigid mandrel element 132. In some embodiments, second cross section perimeter 154 has a size and shape that is similar to those of first cross section perimeter 144.

Second bottom surface 155 opposes second portion 124 of contoured surface 120. Second rigid mandrel element 132 has a second length 156 along the longitudinal direction of articulating stringer mandrel 112 and composite stringer 102. Second length 156 is defined at least in part by the second surface complexity and is larger than first length 146. Although second length 156 is larger than first length 146, the surface complexity at second portion 124 is less than the surface complexity at first portion 122. Accordingly, gap 139 remains below the gap threshold.

In the example provided, third rigid mandrel element 134 smoothly transitions between first rigid mandrel element 130 and second rigid mandrel element 134. Third rigid mandrel element has a first longitudinal end 160, a second longitudinal end 162, and a third cross section perimeter 164. Third cross section perimeter 164 varies through the length of third rigid mandrel element 134 and is substantially identical to first cross section perimeter 144 at first longitudinal end 160 and is substantially identical to second cross section perimeter 154 at second longitudinal end 162.

Cable 136 may be any cable capable of applying tension to articulating stringer mandrel 112 and of withstanding the temperatures and pressures of the autoclave process. Cable 136 extends through aperture 142, aperture 152, and mandrel balls 138. In the example provided, cable 136 is a steel cable.

Mandrel balls 138 each define a pivot surface 170 and an aperture 172. Each mandrel ball 138 is disposed between each adjacent rigid mandrel element 130, 132, 134 at least partially within cavities 140, 150. In the example provided, mandrel balls 138 are substantially enclosed by adjacent rigid mandrel elements 130, 132, 134 within cavities 140, 150. Pivot surface 170 opposes the surface of cavities 140, 150 and has a shape that is substantially the same as the surface of cavities 140, 150. First rigid mandrel element 130 and second rigid mandrel element 132 may pivot with respect to each other while maintaining alignment with each other using mandrel balls 138. Aperture 172 receives cable 136.

Figure 5:
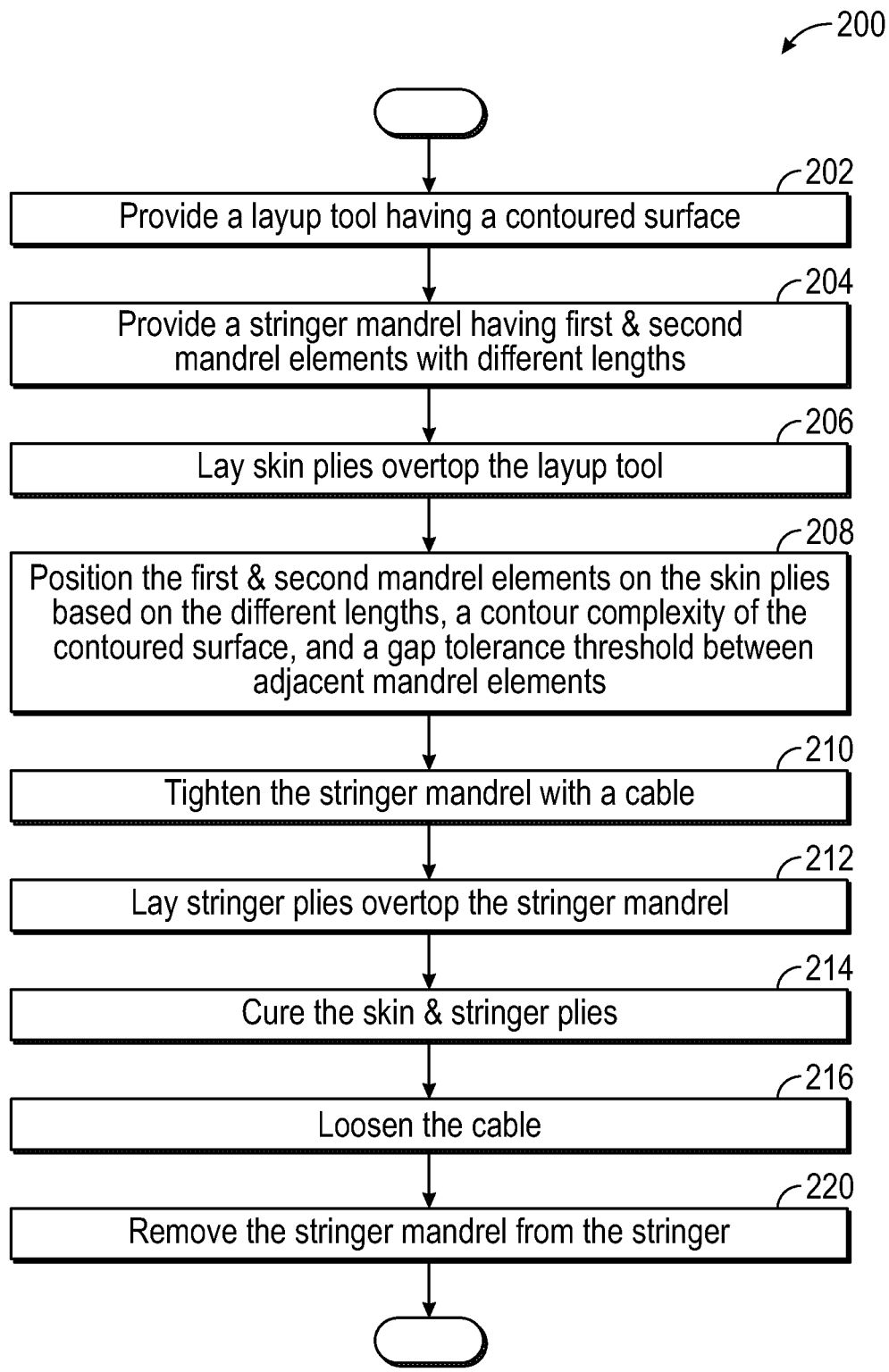
FIG. 5 is a flow diagram for a method manufacturing a composite stringer of an aircraft in accordance with an exemplary embodiment.

Referring now to FIG. 5, a method 200 of manufacturing a composite stringer of an aircraft is provided in accordance with some embodiments. The described process steps, procedures, and materials are to be considered only as exemplary embodiments designed to illustrate to one of ordinary skill in the art methods for practicing the invention; the invention is not limited to these exemplary embodiments. Various steps in the manufacture of reinforced composite structures are well known and so, in the interest of brevity, some conventional steps will only be mentioned briefly herein or will be omitted entirely without providing the well-known process details.

A layup tool with a contoured surface is provided in operation 202. For example, layup tool 110 may be provided. A stringer mandrel is provided in operation 204, where the stringer mandrel has first and second mandrel elements with different lengths. For example, articulating stringer mandrel 112 may be provided. Operation 206 lays skin plies overtop the layup tool. For example, skin plies of composite skin 104 may be laid overtop layup tool 110.

In operation 208, first and second mandrel elements are positioned on the skin plies based on the different lengths, a contour complexity of the contoured surface, and a gap tolerance threshold between adjacent mandrel elements. For example, the order of rigid mandrel elements 130, 132 along a length of articulating stringer mandrel 112 may be selected based on first length 146, second length 156, the surface complexity at first portion 122, the surface complexity at second portion 124, and the predetermined gap threshold. Specifically, the order is selected so that shorter mandrel elements are placed at more complex portions of contoured surface 120 to ensure that gap 139 does not exceed the predetermined gap threshold.

In some embodiments, mandrel elements having different cross section perimeter areas are utilized. In such embodiments, mandrel elements having larger cross section perimeter areas are placed closer to the end of the composite stringer through which the stringer mandrel will be removed in operation 220 described below.

The stringer mandrel is tightened with a cable in operation 210. For example, articulating stringer mandrel 112 may be tightened with cable 136 in tension between two end mandrels of the stringer mandrel. Stringer plies are laid overtop the stringer mandrel in operation 212. For example, stringer plies of composite stringer 102 may be laid overtop articulating stringer mandrel 112 in operation 212.

The skin plies and the stringer plies are cured in operation 214. For example, a vacuum bag arrangement may be arranged over the stacked plies and mandrel to apply a vacuum. Heat and pressure are applied to co-cure the skin plies and the stringer plies to form composite stringer 102 affixed to composite skin 104, as will be appreciated by those with ordinary skill in the art. Well known processes and conditions for applying heat and pressure to uncured fiber reinforced materials (e.g., an autoclave in combination with the vacuum bag arrangement) may be used to co-cure composite stringer 102 and composite skin 104. In some embodiments, composite skin 104 and composite stringer 102 may be cured separately.

The cable is loosened in operation 216. For example, tension in cable 136 may be relieved in operation 216. The stringer mandrel is removed from the stringer in operation 220. For example, articulating stringer mandrel 112 may be pulled out from between composite stringer 102 and composite skin 104 in operation 220. In the example provided, the metallic material of articulating stringer mandrel 112 has a coefficient of thermal expansion that is greater than the coefficient of thermal expansion for the composite material. Accordingly, rigid mandrel elements 130, 132, 134 will shrink more than composite stringer 102 when cooling down from curing temperatures. By shrinking more than the composite stringer 102, rigid mandrel elements 130, 132, 134 create a clearance that facilitates removal of articulating stringer mandrel 112. In some embodiments, cable 136 may be pulled to remove articulating stringer mandrel 112.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of manufacturing a composite stringer of an aircraft, the method comprising:
    laying skin plies on a layup tool that includes a contoured surface having a first portion with a first surface complexity and a second portion with a second surface complexity;
    placing an articulating stringer mandrel on the skin plies, wherein placing the articulating stringer mandrel further includes:
        positioning a first rigid mandrel element on the skin plies so that a first bottom surface of the first rigid mandrel element opposes the first portion, wherein the first rigid mandrel element defines a first aperture and a first stringer surface to which the composite stringer conforms, the first rigid mandrel element having a first length along a longitudinal direction of the composite stringer; and
        positioning a second rigid mandrel element on the skin plies adjacent to the first rigid mandrel element so that a second bottom surface of the second rigid mandrel element opposes the second portion, the second rigid mandrel element defining a second aperture and a second stringer surface to which the composite stringer conforms, the second rigid mandrel element having a second length along the longitudinal direction,
        wherein the positioning the first rigid mandrel element is based at least in part on the first length and the first surface complexity and positioning the second rigid mandrel element is based at least in part on the second length and the second surface complexity so that a gap between the first rigid mandrel element and the second rigid mandrel element does not exceed a predetermined gap threshold; and
    tightening a cable that extends through the first aperture and the second aperture;
    laying stringer plies overtop the articulating stringer mandrel; and
    curing the skin plies and the stringer plies.

2. The method of claim 1, wherein placing the articulating stringer mandrel further includes positioning a mandrel ball between the first rigid mandrel element and the second rigid mandrel element, the mandrel ball defining a pivot surface on which the first rigid mandrel element and the second rigid mandrel element may pivot with respect to each other.

3. The method of claim 2, wherein placing the mandrel ball further includes substantially enclosing the mandrel ball within a first cavity defined by the first rigid mandrel element and a second cavity defined by the second rigid mandrel element.

4. The method of claim 1, wherein positioning the first rigid mandrel and positioning the second rigid mandrel are further based on composite process characteristics that impact stepping in the composite stringer.

5. The method of claim 1, wherein positioning the first rigid mandrel element further includes positioning a plurality of the first rigid mandrel element at portions of the layup tool where surface complexity exceeds a complexity threshold, and wherein positioning the second rigid mandrel element further includes positioning a plurality of the second rigid mandrel element at portions of the layup tool where surface complexity is less than the complexity threshold, and wherein the first length is less than the second length.

6. The method of claim 5, wherein the plurality of the first rigid mandrel elements and the plurality of the second rigid mandrel elements have substantially identical cross section perimeters.

\* \* \* \* \*